June 23, 1953 P. J. BOTT 2,643,281

LIVE LINE STICK WITH RAIN SHIELD

Filed Jan. 13, 1949

INVENTOR
PERRY J. BOTT
BY
Em Harrington,
ATTORNEY

Patented June 23, 1953

2,643,281

UNITED STATES PATENT OFFICE 2,643,281

LIVE LINE STICK WITH RAIN SHIELD

Perry Joseph Bott, Little Rock, Ark., assignor to James R. Kearney Corporation, St. Louis, Mo., a corporation of Missouri Application January 13, 1949, Serial No. 70,740

1 Claim. (Cl. 174—5)

This invention relates generally to live line sticks adapted for use in the repair, service and maintenance of energized lines of electrical power distribution systems, and more specifically to such sticks which are provided with means for affording protection to users of live line sticks against the danger of receiving electrical shocks as a result of rain water falling on the sticks and creating conductive paths therealong, the predominant object of the invention being to provide an improved live line stick which is provided with a rain shield that is so arranged and related to the live line stick as to prevent creation of a conductive path by rain water along the stick.

Figure 1:
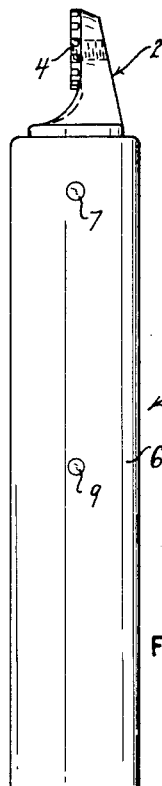
Fig. 1 is an elevational view of the improved live line stick of this invention, a portion of the pole thereof being broken away to permit of the view being drawn to a larger scale.

In the drawing, wherein is shown for purposes of illustration, merely, one embodiment of the invention, A designates the improved live line stick generally. The live line stick A includes an elongated pole 1 which is provided at its upper end with a head 2, said head comprising a ferrule portion 3 from which is extended upwardly a portion 4 which is adapted to have attached thereto various tools employed in repairing, servicing, and maintaining energized lines of electrical power distribution systems. The ferrule portion 3 of the head 2 receives the upper portion of the pole 1 and the annular wall of the ferrule portion 3 of the head 2 is embraced by a sleeve 5 which is formed of Bakelite, or other suitable electrical insulating material, said sleeve at its top edge abutting against an annular shoulder 3' formed at the top of the annular wall of the ferrule portion 3 of the head 2. Preferably, a layer of suitable cement is interposed between the inner face of the sleeve 5 and the outer face of the annular wall of the ferrule portion 3 of the head 2 in order to provide a water-tight joint between said parts.

Figure 2:
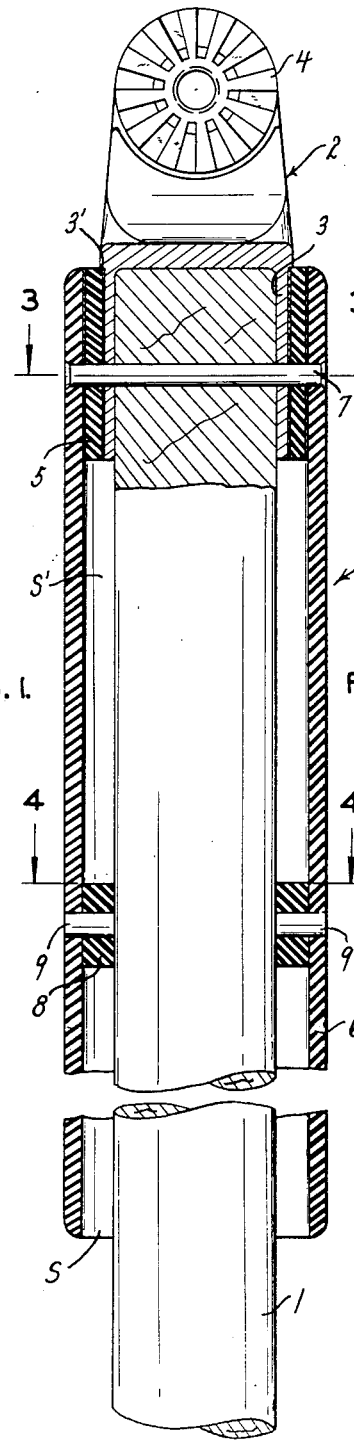
Fig. 2 is an enlarged vertical section of the stick shown in Fig. 1.
Figure 3:
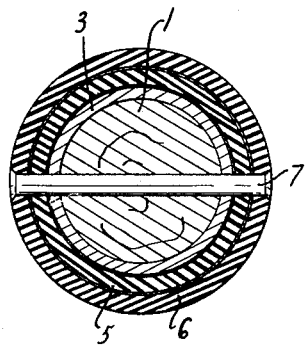
Fig. 3 is a horizontal section taken on line 4—4 of Fig. 2.
Figure 4:
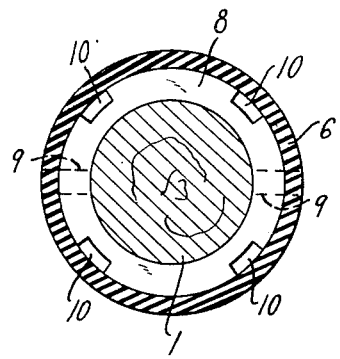
Fig. 4 is a horizontal section taken on line 4—4 of Fig. 2.

Mounted outwardly of the sleeve 5 is an elongated, tubular member 6 which is formed of Bakelite, or other suitable electrical insulating material. This tubular member embraces an upper portion of the pole 1, in spaced relation with respect thereto, and serves as a rain shield, there being a layer of suitable cement interposed between the outer circumferential face of the sleeve 5 and an adjacent portion of the face of the bore through the tubular member 6 so that the joint between the sleeve and the upper portion of the tubular member is rendered water-tight. The pole 1, the head 2, the sleeve 5, and the elongated tubular member 6 are secured together by a rivet 7 which extends transversely of the stick structure, as is shown in Figs. 2 and 3, through apertures formed through the said parts which are secured together by said rivet.

The elongated tubular member 6 is provided at a point between its opposite ends with an annular spacer 8 formed of Bakelite, or other suitable electrical insulating material, the face of the bore through said spacer contacting with the outer face of the pole 1, while the circumferential face of said spacer contacts with the face of the bore through said elongated tubular member. The spacer is secured to the elongated, tubular member 6 by a pair of alined pins 9 which extend through apertures formed through the walls of the elongated, tubular member and the spacer, said pins, by preference, being secured in place in said apertures by means of suitable cement so as to render water tight the joints between the pins and the walls of the apertures in which said pins are disposed. The spacer 8 is provided with circumferentially spaced, vertically extended notches 10, which are open at the top and bottom faces of said spacer which serve a purpose to be hereinafter set forth.

In the use of the improved live line stick of this invention while rain is falling, the portion of the pole 1 which is embraced by the elongated tubular member 6 is completely shielded from the rain so that it remains dry. As a result of this situation no conductive path may be created by rain water lengthwise of the pole as was possible in the use of the un-shielded live line sticks which were heretofore in general use. Also, because of the space S between the lower end portion of the elongated, tubular member 6 and the pole 1, there can be no passage of electrical energy from the wet outer surface of said elongated, tubular member to the wet outer face of the pole. Additionally, due to the presence of the notches 10 in the spacer 8 air is admitted into the space S' between the wall of the elongated, tubular member 6 and the circumferential face of the pole 1 so as to avoid sweating which might result in moisture being present in said space S'.

I claim:

A live line stick comprising an elongated pole having a tool-receiving head mounted at its upper end, said head being provided with a ferrule portion which receives the upper portion of said pole, a sleeve embracing said ferrule portion of said head, an elongated tubular member formed of electrical insulating material whose upper portion embraces said sleeve, said elongated tubular member being of substantially greater diameter than said pole and being arranged in embracing relation with respect to a portion of said pole with the wall of said elongated tubular member spaced from the circumferential face of said pole in substantial parallelism therewith so as to provide an annular space of substantially constant width between the face of the bore of said elongated tubular member and the circumferential face of said pole, material for rendering water tight the joint between said ferrule portion of said head and said sleeve and the joint between said sleeve and the upper portion of said elongated tubular member, and an annular spacer located within the space between the wall of said elongated tubular member and the circumferential face of said pole in downwardly spaced relation with respect to said sleeve, said spacer being provided with air passageways formed therein.

PERRY JOSEPH BOTT.

References Cited in the file of this patent

UNITED STATES PATENTS

| Number | Name | Date |
| --- | --- | --- |
| 904,097 | Spring | Nov. 17, 1908 |
| 1,859,390 | Green | May 24, 1932 |
| 2,114,736 | De Right | Apr. 19, 1938 |
| 2,329,391 | Cappellanti | Sept. 14, 1943 |
| 2,430,703 | Bowne | Nov. 11, 1947 |
| 2,438,504 | Hubbard | Mar. 30, 1948 |